Dec. 30, 1969   M. J. BRUGGEMAN   3,486,253
FLOATING EARTHMOVING APPARATUS
Filed Dec. 6, 1965   2 Sheets-Sheet 1
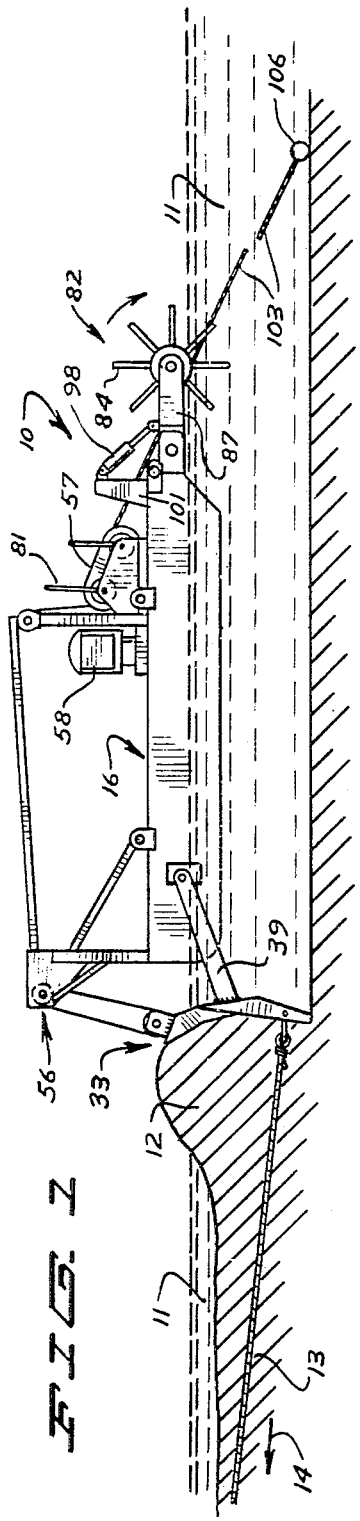
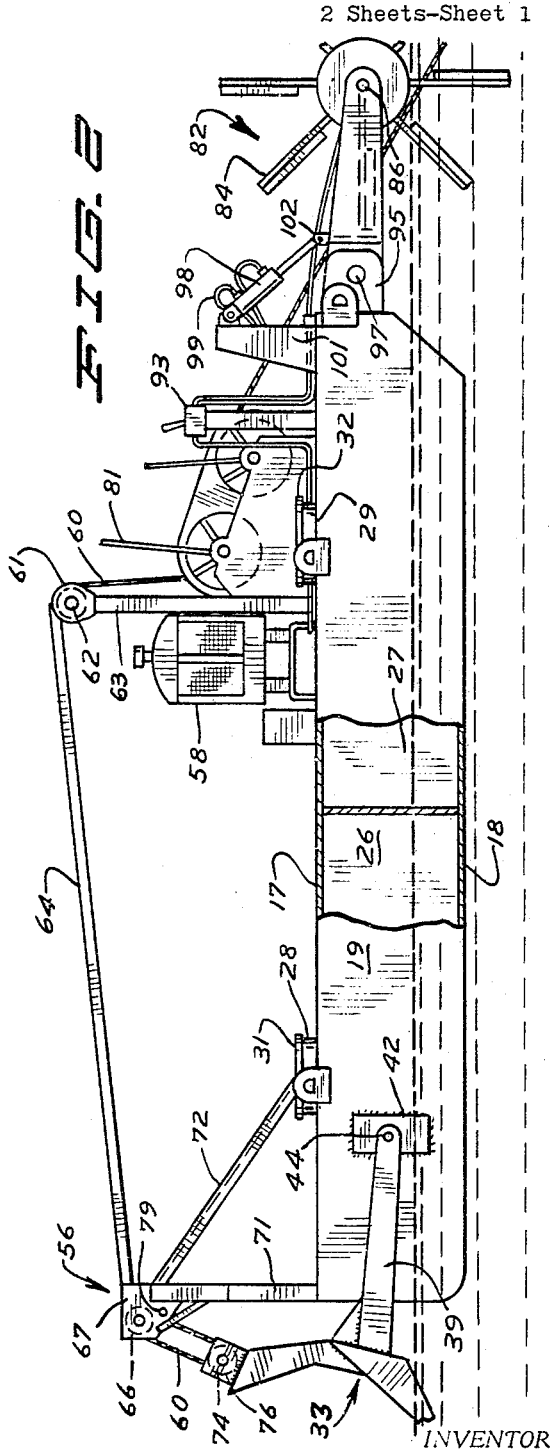
INVENTOR.
MORRIS J. BRUGGEMAN
BY
Braddock & Burd
ATTORNEYS Dec. 30, 1969  M. J. BRUGGEMAN  3,486,253
FLOATING EARTHMOVING APPARATUS
Filed Dec. 6, 1965  2 Sheets-Sheet 2
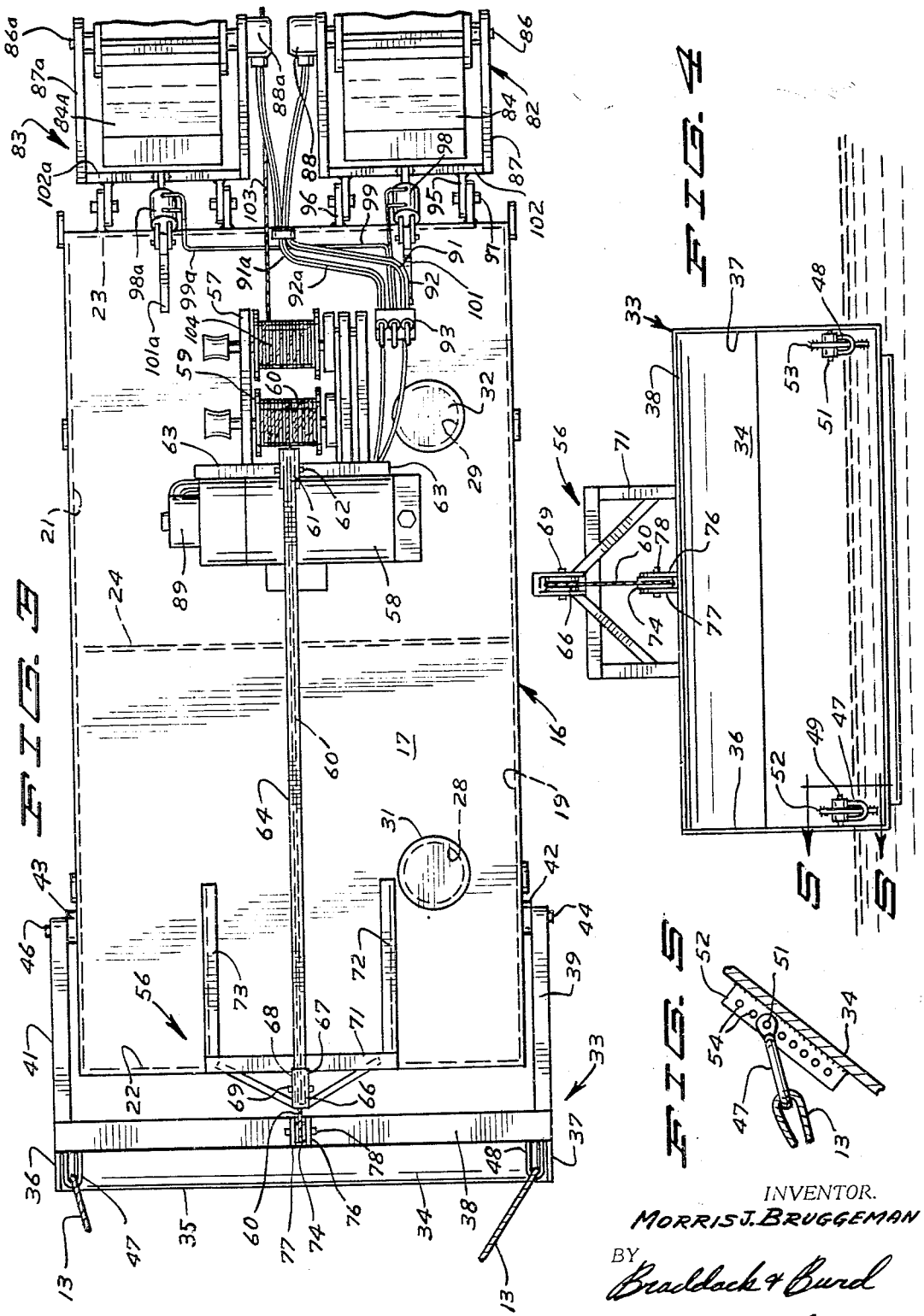
INVENTOR.
MORRIS J. BRUGGEMAN
BY
Braddock & Burd
ATTORNEYS

United States Patent Office 3,486,253
Patented Dec. 30, 1969

1

3,486,253
FLOATING EARTHMOVING APPARATUS
Morris J. Bruggeman, c/o Bruggeman Construction,
Milaca, Minn. 56353
Filed Dec. 6, 1965, Ser. No. 511,810
Int. Cl. E02f *3/76;* B63h *5/02*
U.S. Cl. 37—54                                11 Claims

ABSTRACT OF THE DISCLOSURE

An earthmoving machine having a transverse scraper blade pivotally connected to a flotation unit by a pair of arms extended adjacent the sides of the unit. A lift mechanism mounted on the flotation unit and connected to the top of the blade operates to control the elevation of the blade. The machine is propelled by water wheels secured to the rear of the flotation unit. During an excavating operation, the machine is propelled forward by a power unit separated from the flotation unit and connected to the blade by a cable.

---

This invention relates to an apparatus for clearing and removing material from a shallow body of water, as a lake, bog, marsh and similar areas of soft ground. More particularly, the invention relates to a flotation unit in combination with a material collecting and moving blade used to dig out and remove floating islands in deep bodies of water such as lakes, sewage lagoons and material located along the bottom of a shallow body of water, swamp or bog. The excavation apparatus is used in areas that cannot support conventional earth moving equipment.

Briefly described, the invention relates to an excavation apparatus which floats on a body of water so as to be readily moved to a desired location. The excavation apparatus utilizes a flotation unit and a generally upright blade positioned transversely adjacent one end of the unit. The blade is mounted on the unit for movement in a generally upright direction so that it may be raised and lowered to change the digging action of the blade. The blade is raised and lowered by a lift mechanism mounted on the flotation unit. The lift mechanism is operated from the flotation unit so that the position of the blade may be readily changed as required. To propel the flotation unit over the body of water a pair of drive units are secured to the end of the flotation unit opposite the blade. In locations where the drive units are ineffective the excavation apparatus is pulled with power equipment connected to the apparatus with a cable. When not in use, the drive units can be elevated out of the water with a mechanical or hydraulic power means. In a shallow water the depth of the drive units can be changed as needed to provide effective propulsion of the flotation unit.

In the drawing:

FIGURE 1 is a side view of the excavation apparatus of this invention in use on a shallow body of water;

FIGURE 2 is an enlarged side view of the excavation apparatus of FIGURE 1 having parts broken away to show the construction of the flotation unit;

FIGURE 3 is a plan view of FIGURE 2;

FIGURE 4 is a front elevational view of the excavation apparatus; and

FIGURE 5 is an enlarged sectional view taken along the line 5—5 of FIGURE 4.

Referring to the drawing, there is shown in FIGURE 1, the excavation apparatus of this invention indicated generally at 10 in use on a shallow body of water 11, as a lake, river, bog, marsh and the like areas of soft ground. The apparatus 10 is pulled across the water to remove bottom material 12, as earth, weeds, slit and the like. The excavation apparatus 10 is moved in a forward direction indicated by arrow 14 by a cable 13 attached at one end to the apparatus and to a power unit (not shown) as a bulldozer, tractor, power operated winch, or the like located on solid ground. In use, the excavation apparatus 10 is repeatedly moved forward and backward to displace the bottom material.

Excavation apparatus 10 has a flotation unit indicated generally at 16 shown as a flat barge or hull having a flat rectangular deck 17 located above a flat bottom 18. The space between the deck 17 and the bottom 18 is enclosed with upright side wall 19 and 21 and upright end walls 22 and 23 forming an enclosed hold. A transverse wall 24 separates the hold into two substantially equal chambers 26 and 27. Access into the chambers 26 and 27 is through manholes 28 and 29 in the deck 17. Flat covers 31 and 32 are used to close the manholes 28 and 29, respectively.

As shown in FIGURE 3, an upright blade indicated generally at 33 located adjacent the forward end of the flotation unit 16 extends transversely of the flotation unit. Blade 33 has a width and height greater than the width and height of the flotation unit. The blade 33 has an upright concave curved back 34 terminating in a straight horizontal lower cutting edge 35. Secured to the opposite sides of the back 34 are forwardly projected side flanges 36 and 37. A horizontal top flange 38 secured to the top edge of the back 34 projects in a forward direction and forms with the side flanges 36 and 37 a shallow cavity for confining material to the blade.

The blade 33 is attached to the flotation unit 16 by a pair of support members or arms 39 and 41 located adjacent the opposite side walls 19 and 21 of the flotation unit. The forward ends of the arms 39 and 41 are secured by welds or the like to opposite portions of the back 34. From the back 34 the arms 39 and 41 project rearwardly and terminate in ends pivotally connected to the flotation unit. Plates 42 and 43 carrying outwardly projected stub axles 44 and 46, respectively, are secured to the side walls 19 and 21. Stub axles 44 and 46 projected laterally in opposite directions through holes in the ends of the arms 39 and 41 thereby pivotally mount the blade 33 on the flotation unit 16 for movement in a generally upright plane about a horizontal transverse axis. This enables blade 33 to be raised and lowered relative to the flotation unit.

The blade 33 is raised and lowered by a lift mechanism indicated generally at 56 mounted on the deck 17 of the flotation unit. The lift mechanism 56 comprises a winch unit 57 driven by a motor 58 as an internal combustion engine. Winch unit has a first drum 59 carrying a cable 60. From the drum 59 cable 60 extends upwardly over a pulley 61 having a transverse pin 62 rotatably mounted on upright plates of a support frame 63. The lower ends of frame 63 are secured to the deck 17. A longitudinal tubular beam 64 is secured at one end to the top of frame 63. Beam 64 is a tubular member which carries cable 60, indicated in broken lines in FIGURE 3, to a pulley 66 positioned between upright plates 67 and 68. A transverse pin 69 rotatably mounts the pulley 66 on plates 67 and 68. The plates 67 and 68 are secured to and extend forwardly from the top of an upright frame 71 secured to the front end of the deck 17. Diagonal braces 72 and 73 reinforce the upright position of frame 71. From the pulley 66 cable 60 extends downwardly around a pulley 74 positioned between a pair of upright plates 76 and 77 secured to the mid-portion of the transverse top flange 38 of the blade. A pin 78 rotatably mounts the pulley 74 between the plates 76 and 77. The end of cable 60 is secured by fastening means 79 as a bolt to plate 67.

The motor 58 drives the winch 57 rotating drum 59 to collect the cable 60. In this manner blade 33 is moved upwardly about the pivot axes of the stub axles 44 and 46. Winch 57 has a hand control lever 81 used to control rotation of the drum 59 so that an operator can vary the elevation of the blade 33 during the digging and removal of the bottom material 12.

As shown in FIGURES 4 and 5 U-shaped clevices 47 and 48 are used to connect cable 13 to opposite sides of the front of blade 33. The clevices are pivotally attached by pins 49 and 51 projected through the ends of clevices and holes 54 in upright plates 52 and 53 secured to the back 34. Each plate 52 and 53 has a plurality of holes 54 for selectively receiving pins 49 and 51 so that the draft angle on blade 33 can be altered.

To propel the flotation unit 16 over the water a pair of identical drive units indicated generally at 82 and 83 are pivotally attached to the stern of the unit for movement about transverse horizontal axes. The following description is directed to drive unit 82. The parts of drive unit 83 corresponding to parts of drive unit 82 are identified with the same reference number having the suffix a. Drive unit 82 includes a paddle wheel 84 rotatably secured to a transverse drive shaft 86. A U-shaped frame 87 secured to the end wall 23 projects rearwardly adjacent opposite sides of the paddle wheel 84 and is rotatably connected to opposite ends of the shaft 86 thereby mounting the paddle wheel on the stern of flotation unit 16. The base of frame 87 has a pair of forwardly projected plates 95 positioned adjacent rearwardly projetced plates 96 secured to the stern end wall 23. Pins 97 project through suitable holes in the plates 95 and 96 to pivotally mount frame 87 on the flotation unit.

A hydraulic motor 88, as a rotary gear motor, drivably coupled to the shaft 86 is operable to rotate the shaft as well as the paddle wheel 84. Hydraulic fluid under pressure is supplied to the motor 88 by a pump 89 drivably connected to the motor 58. Fluid from the pump 89 travels through supply line 91 and returns to the pump through return line 92. The flow of fluid to the motor 88 is controlled by a valve 93 in lines 91 and 92 to fluidly connect the motors 88 and 88a in parallel or in series as well as reverse the flow of liquid to the lines 91, 91a and 92 and 92a and thereby change the direction of rotation of the paddle wheels 84 and 84a.

Drive unit 82 is raised and lowered with a power means 98, shown as a piston and cylinder assembly connected to valve 93 with lines 99. Power means 98 may be a mechanical mechanism as a winch or the like. The upper end of the cylinder is pivotally attached to an upright triangular support 101 secured to deck 17. The lower end of the piston is pivotally attached to transverse beam 102 secured to the top of the frame 82. In use, one control handle of valve 93 is moved to direct fluid under pressure to power means 98 to pivot the frame 87 thereby changing the elevation of the paddle wheel 84. The power means 98 is capable of holding the frame in a down positon wherein the paddle wheel digs into the bottom of a shallow lake functioning as a drive wheel. In the event that drive unit 82 is not being used power means 98 holds the drive unit in a raised or up position.

As shown in FIGURE 1, the excavation apparatus 10 may be removed in a reverse direction by the use of a cable 103 wound around rear drum 104 of winch 57. The opposite end of cable 103 is secured to a dead man or anchor 106. In use, the anchor 106 is located on the opposite shore of a small body of water or swamp or on a walking spud in a large lake or swamp. Winch 57 and cable 103 are used in locations where the paddle wheels 84 and 84a do not provide sufficient force to move the flotation unit.

In use, the excavating apparatus 10 is pulled forwardly across a work area, such as a shallow body of water, lake, bog or marsh or the like, by power equipment located on solid ground. To clear the bottom of the work area the blade 33 is lowered as shown in FIGURE 1 so that it collects the bottom material 12 moving it forwardly toward shore and solid ground. At the end of forward movement of the apparatus 10 blade 33 is raised with the lift mechanism 56. The apparatus 10 is then moved back to its initial location either by the use of the drive units 82 and 83 or the use of drum 104, cable 103 and dead man anchor 106. With the lowering of the blade 33 the apparatus is ready to be moved in a forward direction to take a second material removing cut. The forward and reverse movements of excavation apparatus is repeated until the entire work area is cleared.

I claim:

1. An excavation apparatus comprising: a shallow draft flotation unit capable of floating on the surface of a relatively shallow body of water, said unit having upright side walls, a generally flat horizontal bottom secured to the side walls, a front wall and a rear wall secured to the side walls and bottom, generally upright blade means position transversely adjacent the front wall, said blade means having a transverse bottom edge extended generally parallel to the horizontal bottom of the flotation unit, a transverse width greater than the width of the flotation unit, and a height greater than the front wall, arms secured to opposite sides of the blade means and projected rearwardly adjacent the side walls, means secured to the side walls and connected to the arms pivotally mounting the arms for movement about a transverse axis, lift means mounted on the flotation unit and connected to the blade means operable to raise and lower the blade means with respect to the flotation unit, a power unit separated from the flotation unit having a cable, means for connecting said cable to opposite side portions of the blade means in general alignment with the longitudinal planes of the arms whereby said power unit pulls both the flotation unit and blade means to move material collected by the blade means.

2. The excavation apparatus defined in claim 1 wherein said blade means has a concave curved back terminating in a horizontal straight bottom edge.

3. The excavation apparatus defined in claim 1 wherein the means for connecting the cable to opposite portions of the blade means comprise connector means adjustably joining the cable to the blade means for changing the elevation of and angle of draft on the blade means.

4. The excavation apparatus defined in claim 1 wherein said lift means comprises a winch having a cable, a motor to drive the winch, said winch and motor located on the rear portion of the flotation unit, frame means secured to the flotation unit and projected upwardly from the front end of the flotation unit, pulley means rotatably carried on the frame means directing the cable to the blade means and means connecting the cable to the blade means whereby when the winch is operated to wind up the cable the blade means is elevated.

5. The excavation apparatus defined in claim 1 including at least one drive unit secured to the rear wall, said drive unit having a paddle wheel engageable with the water for moving the flotation unit over the water and means for raising and lowering and for rotating said paddle wheel.

6. The excavation apparatus of claim 1 wherein: the means for connecting the cable to the blade means comprise upright means secured to the blade means in alignment with the general longitudinal planes of the arms, and connectors attached to the cable and carried by the upright means at selected upright positions for changing the draft angle of the blade means.

7. An excavation apparatus comprising: a shallow draft flotation unit capable of floating on the surface of a relatively shallow body of water, generally upright blade means positioned transversely adjacent one end of the unit, said blade means having a back side larger than and facing said one end of the unit, support means connecting the blade means to said unit for movement in a generally upright plane, said support means including rearwardly directed arm means rigidly secured to opposite side portions of the back side of the blade means and pivotally mounted on the flotation unit, means carried by the unit and connected to the blade means operable to raise and lower the blade means with respect to the flotation unit, a power unit separated from the flotation unit having a cable, means for connecting said cable to opposite side portions of the blade means in general alignment with longitudinal planes of the arms means whereby said power unit pulls both the flotation unit and blade means to move material collected by the blade means.

8. The apparatus defined in claim 7 wherein said flotation unit is a flat barge.

9. The apparatus defined in claim 7 wherein the means operable to raise and lower the blade means includes a winch having a cable connected to the blade means and an upright frame on said one end of the unit, said frame cooperating with a portion of the cable between the blade means and winch.

10. The apparatus of claim 7 including drive means having at least one member engageable with the water for moving the flotation unit over the water.

11. The excavation apparatus of claim 7 wherein: the means for connecting the cable to the blade means comprise upright means secured to the blade means in alignment with the general longitudinal planes of the arms, and connectors attached to the cable and carried by the upright means at selected upright position for changing the draft angle on the blade means.

References Cited

UNITED STATES PATENTS

| | | | |
|---|---|---|---|
| 1,070,853 | 8/1913 | Steinbrecker. | |
| 1,293,706 | 2/1919 | Charboneau | 56—9 |
| 1,723,115 | 8/1929 | Zickgraf | 37—71 |
| 1,801,652 | 4/1931 | Alby | 37—71 XR |
| 2,486,275 | 10/1949 | Grinwald. | |
| 2,874,489 | 2/1959 | Orjala | 37—117.5 |
| 3,230,645 | 1/1966 | Lutz | 37—117.5 XR |
| 2,606,375 | 8/1952 | Braun et al. | 37—75 |
| 2,853,812 | 9/1958 | Van Riet et al. | 115—1 XR |

ROBERT E. PULFREY, Primary Examiner

CLIFFORD D. CROWDER, Assistant Examiner

U.S. Cl. X.R.

37—115; 115—54; 172—808